United States Patent [19]

Hosoya

[11] Patent Number: 5,653,201
[45] Date of Patent: Aug. 5, 1997

[54] INDUCTION SYSTEM FOR VEHICLE ENGINE

[75] Inventor: Takahisa Hosoya, Iwata, Japan

[73] Assignee: Yamaha Hatsudoki Kabushiki Kaisha, Iwata, Japan

[21] Appl. No.: 695,169

[22] Filed: Aug. 8, 1996

[30] Foreign Application Priority Data

Aug. 10, 1995 [JP] Japan .................... 7-204845

[51] Int. Cl.$^6$ ..................................... F02M 35/10
[52] U.S. Cl. ...................... 123/184.34; 123/184.47
[58] Field of Search ................... 123/184.34, 184.42, 123/184.47, 184.53

[56] References Cited

U.S. PATENT DOCUMENTS

| | | | |
|---|---|---|---|
| 2,845,911 | 8/1958 | Gill | 123/184.34 |
| 2,845,912 | 8/1958 | Bird | 123/184.34 |
| 5,564,377 | 10/1996 | Asuma | 123/184.34 |

FOREIGN PATENT DOCUMENTS

| | | | |
|---|---|---|---|
| 2339356 | 3/1975 | Germany | 123/184.47 |
| 3-107520 | 5/1991 | Japan | 123/184.34 |
| 4-134129 | 5/1992 | Japan | 123/184.34 |

*Primary Examiner*—David A. Okonsky
*Attorney, Agent, or Firm*—Knobbe, Martens, Olson &Bear LLP

[57] ABSTRACT

A V-type engine for automotive or vehicular application, wherein a single plenum chamber serves all intake passages of the engine. The single plenum chamber has a triangular configuration and is disposed above one of the cylinder heads with its lower surface extending parallel to the upper surface of the cylinder head and spaced closely adjacent thereto. The runners for the individual cylinder banks have substantially the same length and include flexible couplings therein.

20 Claims, 11 Drawing Sheets

INDUCTION SYSTEM FOR VEHICLE ENGINE

BACKGROUND OF THE INVENTION

This invention relates to an induction system for an engine and more particularly to an improved induction system for a vehicle engine.

The performance of an engine is obviously quite dependent upon the efficiency of its induction system. If the induction system is not properly configured, the mount of air flow to the engine can be either obstructed or restricted under at least some running conditions, and result in poor engine performance. This problem is particularly acute in conjunction with multiple cylinder engines. In many regards, it would be desirable if each cylinder of the engine could be supplied with its own induction system which would be independent of those of the other cylinders. However, practicality simply does not permit this. This is particularly true when it is desirable to simplify the engine through the utilization of a single throttle valve control for controlling the flow of air to all cylinders.

Therefore, multiple cylinder engine induction systems generally include a plenum chamber which has a tuned and relatively large volume and to which air is delivered from the atmosphere through a speed controlling throttle valve. The plenum chamber then communicates with the individual cylinders which it serves through runner passages that extend from the plenum chamber to those cylinders. This type of system has been found to be effective in minimizing adverse effects from the common air inlet that supplies multiple cylinders. That is, the plenum chamber, if it has sufficient volume, can dampen pulsations from one cylinder before they adversely affect the charge flow to another cylinder served by the same plenum chamber. Also, by appropriately tuning the volume of the plenum chamber and the length of the framer sections, it is possible to improve engine performance, particularly at specifically targeted engine speed and/or lead conditions.

Although in theory this concept is quite sensible, it is difficult to follow in actual practice. One reason for this is the space constraints under which most engines operate. These space constraints are particularly prevalent in applications for powering motor vehicles such as automobiles. Basically, the engine compartment of a motor vehicle is relatively small and not always regularly configured because of the intrusion of suspension systems and other components. In addition, there is a desire to maintain a low hood line so as to permit streamlining of the body configuration and lower drag. This obviously makes the problem of the designer in laying out and in configuring the induction system quite difficult.

These problems are further compounded when the engine is mounted in the engine compartment so that its output shaft rotates about a transverse rather than a longitudinally extending direction. In many vehicle configurations, such transverse engine placement is utilized so as to further minimize the spatial requirements of the engine. However, this minimization of the spatial requirements further aggravates the problem of defining an effective induction system.

These problems are further compounded when the engine in question is of the V-type and has angularly disposed cylinder banks. Such V-type engines offer the advantages of being compact, but when placed transversely in the engine compartment, additional problems arise. This is particularly hue when the engine compartment is enclosed by a downwardly sloping hood. With such arrangements, the forwardmost cylinder bank will be disposed much closer to the hood line than the rearwardmost cylinder bank. This further aggravates the problem of providing an effective induction system.

It is, therefore, a principal object of this invention to provide an improved induction system for an automotive or vehicular engine.

It is a still further object of this invention to provide a compact and high-efficiency induction system for a multi-cylinder engine.

It is a still further object of this invention to provide an improved induction system for an engine that is disposed transversely in an engine compartment.

It is a final and additional principal object of this invention to provide an improved induction system for, a V-type automotive engine.

SUMMARY OF THE INVENTION

This invention is adapted to be embodied in an internal combustion engine having a cylinder block with a plurality of cylinder bores. A cylinder head assembly is affixed to one end of the cylinder bank and closes the cylinder bores to form a plurality of combustion chambers. The engine and the cylinder head assembly are configured so that an upper surface of the cylinder head assembly is inclined at an acute angle to a horizontal plane. A plurality of intake passages are formed in the cylinder head assembly for serving the combustion chambers. A plenum chamber is spaced above the cylinder head assembly upper surface and has a generally triangular cross-sectional configuration. The base of this triangle is disposed so that it extends generally parallel to the cylinder head upper surface. A plurality of runner sections extend from within the plenum chamber to the individual cylinder head intake passages for supplying the air charge thereto.

DETAILED DESCRIPTION OF THE PREFERRED EMBODIMENT OF THE INVENTION

Figure 1:
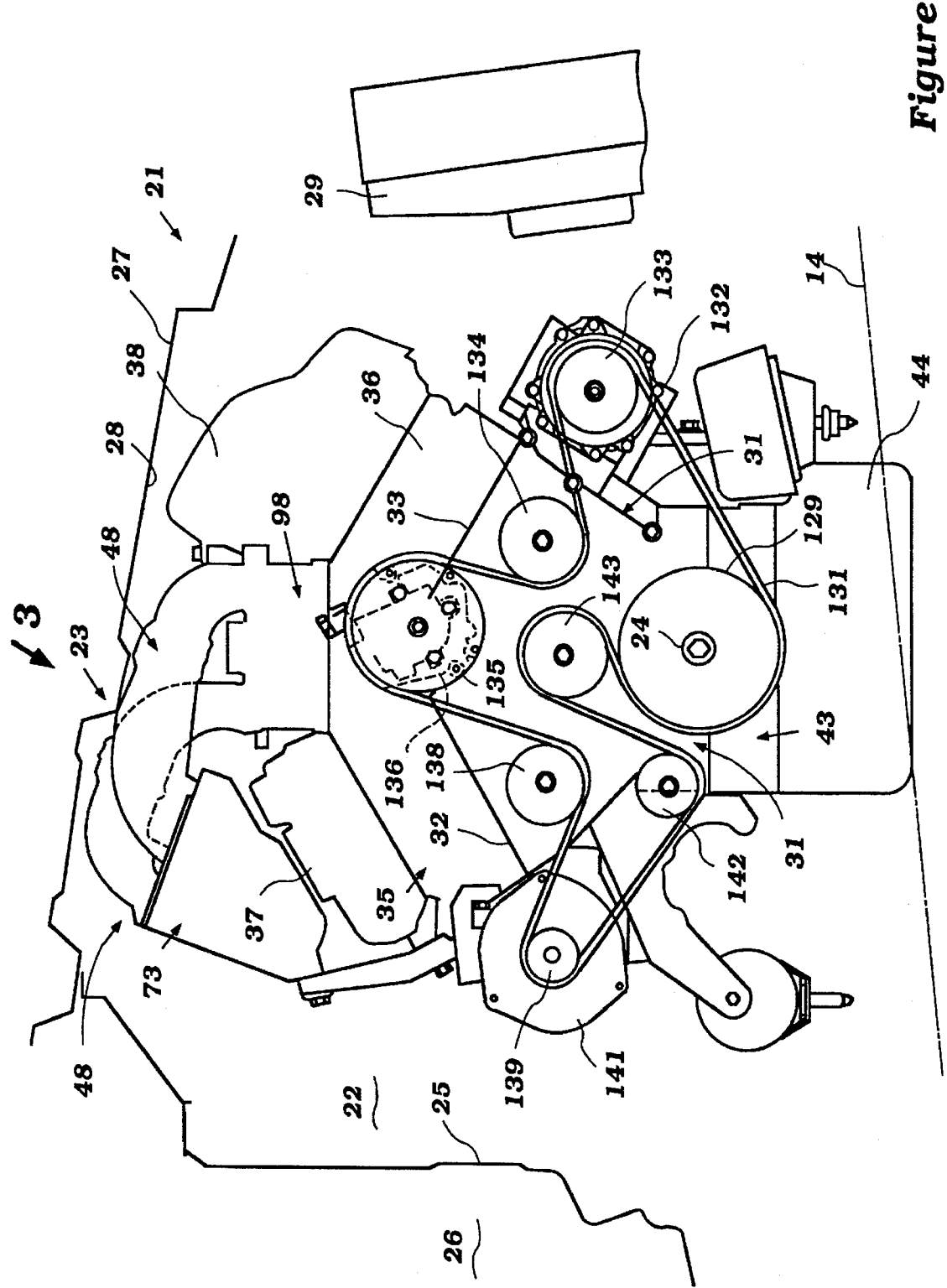
FIG. 1 is a side elevational view looking through the engine compartment of a motor vehicle having an internal combustion engine constructed in accordance with an embodiment of the invention, with the vehicle body being shown in outline form so as to indicate how the engine is configured in relation to the engine compartment.
Figure 2:
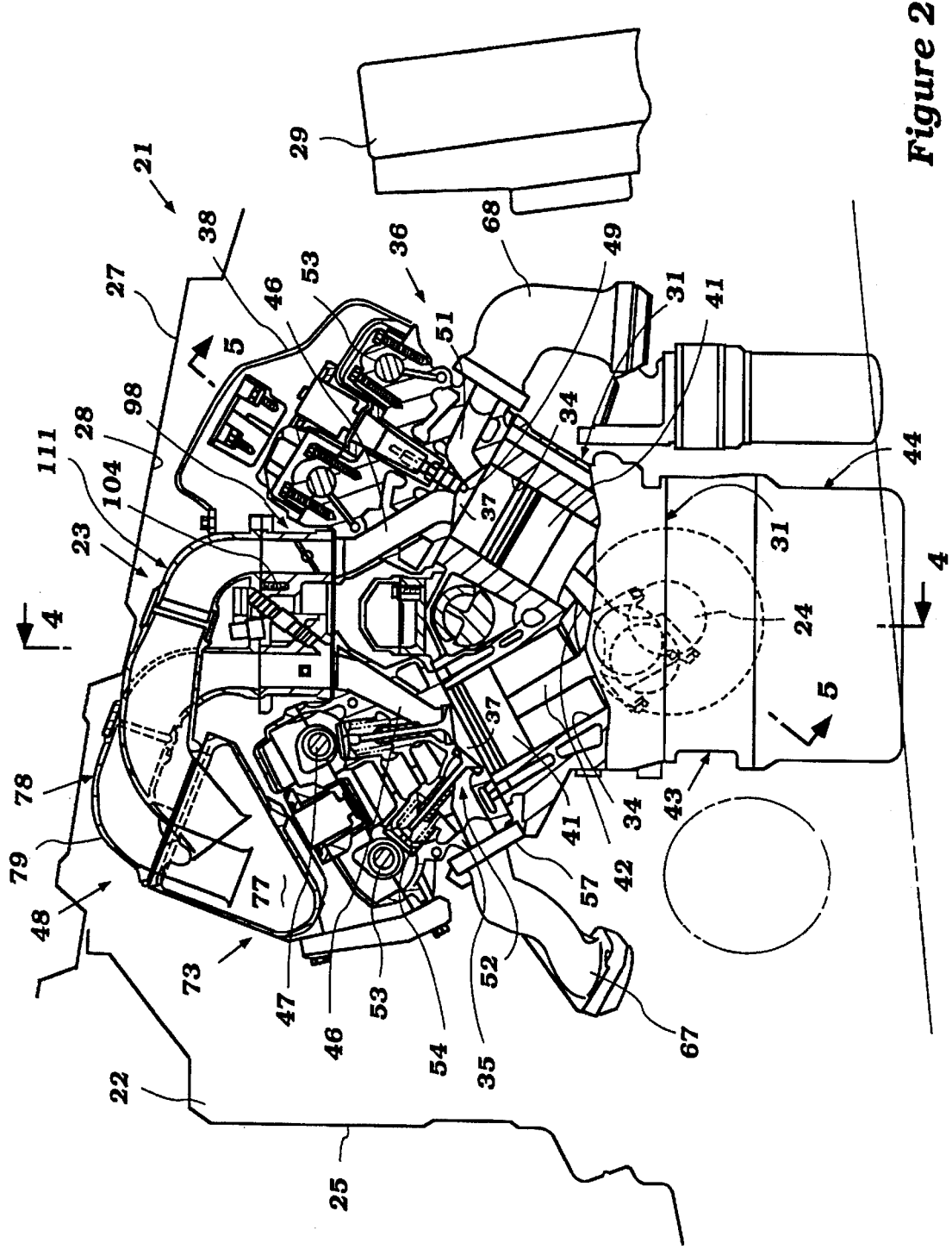
FIG. 2 is a view, looking in the same direction as FIG. 4, but with portions shown in cross section along a line taken along the line 2—2 of FIG. 3 so as to show more of the internal construction of the engine.
Figure 3:
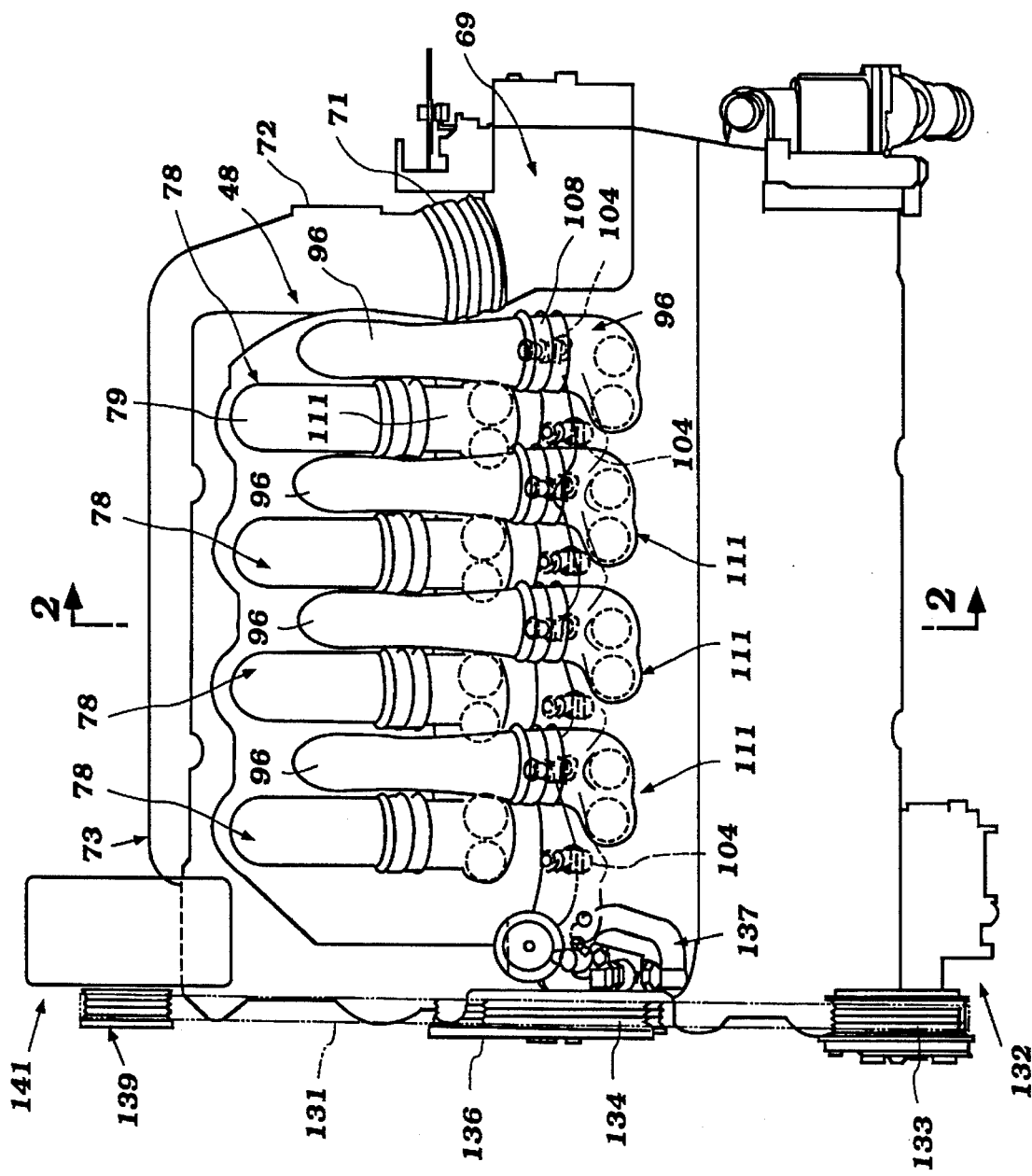
FIG. 3 is a view looking generally in the direction of the arrow 3 in FIG. 2 and shows the induction system as it appears from above.

Referring now in detail to the drawings, and initially to FIGS. 1 and 2, a motor vehicle powered by an internal combustion engine constructed in accordance with an embodiment of the invention is shown partially and in outline form. The vehicle is indicated generally by the reference numeral 21, and these two views show generally the vehicle engine compartment, indicated by the reference numeral 22. In the illustrated embodiment, the vehicle 21 is of the transverse engine, front wheel drive type.

Hence, an internal combustion engine constructed in accordance with an embodiment of the invention is indicated generally by the reference numeral 23 and is mounted in this engine compartment 22 so that its crankshaft 24 rotates about a transversely disposed axis relative to the longitudinal centerline of the vehicle 21. The engine 23 is shown in a vertical orientation in FIG. 1, but actually the engine is tilted slightly forwardly relative to the horizontal, which horizontal is indicated by the phantom line H in FIG. 1.

As may be seen, the engine compartment 22 is formed at the forward end of a toe board 25 which forms the forward portion of a passenger compartment 26. The sides of the engine compartment 22 are closed by fender aprons (not shown) with the upper surface thereof defining a hood opening. This hood opening is closed by a hood 27 having an undersurface 28 which is sloped generally downwardly so as to maintain a streamlined configuration and low drag.

A cooling radiator 29 for the coolant of the engine 23 is mounted at the front of the engine compartment 22. This cooling radiator 29 receives cooling air that flows through a grill opening (not shown) and which exits the engine compartment 22 in an appropriate manner. Coolant is circulated between the radiator 29 and the cooling jacket of the engine 23 in a manner which will be described at least partially later. However, this portion of the engine and vehicle may be of any type known in the art and, therefore, total details of the construction and operation of the cooling system are not believed to be necessary to permit those skilled in the art to practice the invention.

In the illustrated embodiment, the engine 23 has a V-8 configuration. Hence, it is formed with a cylinder block 31 which has a pair of angularly inclined cylinder banks 32 and 33 in each of which are formed for cylinder bores 34. As is typical with V-type engine practice, the cylinder bores 34 of one cylinder bank 32 are staggered slightly relative to the cylinder bores of the remaining cylinder bank 33.

Cylinder head assemblies 35 and 36 are affixed to the cylinder banks 32 and 33, respectively, in closing relationship to the cylinder bores 34. These cylinder heads 35 and 36 have individual recesses 37 formed in the surfaces which mate with the deck surfaces of the cylinder banks 32 and 33 and which form in part the combustion chambers of the engine. As will become apparent as the description proceeds, each cylinder head assembly 35 and 36 is provided with four valves per cylinder which are operated by twin overhead cam mechanisms. This valve train is contained within a cam chamber for each cylinder bank which is closed by a respective cam cover 37 and 38. The cam covers 37 and 38 form, in essence, the uppermost extremities of the base engine and it will be seen that the front cam cover 37 extends higher than the rear cam cover 38.

Pistons 41 are slidably supported in the cylinder bores 34 of the cylinder banks 32 and 33. These pistons 41 cooperate with the cylinder head recesses 37 and the cylinder bores 34 to form the aforenoted combustion chambers of the engine. Since the substantial portion of the volume of the combustion chambers at top dead center is formed by the cylinder head recesses 37, at times this reference numeral will also be utilized to designate the combustion chambers per se.

The pistons 41 are connected by means of piston pins (not shown) to the small ends of connecting rods 42 in a well known manner. The lower or big ends of these connecting rods 42 are journaled on the throws of the crankshaft 24 in a well known manner.

The cylinder block 31 has a lower surface to which a bearing cap and girdle assembly 43 is affixed which forms in part a crankcase chamber for the engine in which the crankshaft 24 rotates. In addition, the bearing arrangement for the crankshaft 24 may be provided by this assembly 43 and the webs of the cylinder block 31 in a manner that is known in this art.

The crankcase chamber is completed by means of a crankcase member or oil pan 44 that is affixed to the lower surface of the girdle assembly 43 and which, accordingly, completes the lower end of the engine. Since the invention deals primarily with the induction system for the engine, many of the details of the internal construction of the engine 23 are not illustrated nor will they be described. Where any components of the engine 23 are not illustrated or described, any known construction may be employed.

As has been previously noted, the engine 23 is of the four-valve per cylinder type. Therefore, on the valley side of each cylinder head assembly 35 and 36, there are provided a pair of intake valves, indicated generally by the reference numeral 45 which control the flow through a pair of intake passages 46 serving each of the combustion chambers 37. These intake valves 45 are urged to their closed positions by means of a coil spring arrangement that operates on a keeper retainer assembly of a known type. The intake valves 45 are opened by means of intake cam shafts 47 that are journaled in the cylinder head assemblies 35 and 36 in a known manner.

An induction system, indicated generally by the reference numeral 48, is positioned in part in the valley between the cylinder banks and supplies a fuel/air charge to the cylinder hem intake passages 46 in a manner which will be described later.

Spark plugs 49 are mounted in the cylinder hems 35 and 36 and have their spark gaps disposed generally at the center of the combustion chamber recesses 37. The spark plugs 49 are fired by a suitable ignition system so as to ignite the fuel/air charge delivered to the combustion chambers 37 by the induction system 48. The charge which has burned in the combustion chambers will expand and drive the pistons 41 downwardly. This charge is then discharged through exhaust passages 51 which are formed in the side of the cylinder hem assemblies 35 and 36, outside of the V or on the outside of the engine 23.

Exhaust valves, indicated generally by the reference numeral 52, are mounted in the cylinder heads 35 and 36 in the same manner as the intake valves 45, and are urged to their closed positions in the same manner. Again, there are two exhaust valves 52 for each combustion chamber recess 37. The exhaust valves 52 are opened by exhaust camshafts 53, which are also journaled in the cylinder head assemblies 35 and 36 in a known manner. The exhaust camshafts 53 operate the exhaust valves 52 through thimble-type tappets 54 in a well-known manner.

The mechanism by which the intake camshafts 47 and exhaust camshafts 53 of each of the cylinder banks is driven will now be described by primary reference to FIGS. 4 and 5. Basically, the system operates so that one of the intake or exhaust camshafts 47 and 53 of each cylinder bank 35 and 36 is driven directly from the crankshaft 27. This drive includes a driving sprocket 55 that is affixed to or formed integrally with the crankshaft 24 at one end thereof. This drive sprocket 55 drives a timing chain 56 which extends upwardly and drives a driving sprocket 57 affixed to the intake or exhaust camshaft 47 or 53 of the cylinder bank 35, in this case the intake cam shaft 47.

This chain 56 then extends downwardly where it drives a balancer shaft sprocket 58 that is mounted in the valley between the cylinder banks and which is affixed to one end of a balancer shaft, indicated generally by the reference numeral 59. This balancer shaft 59 is journaled within a balancer shaft chamber 61 formed above an upper, inner wall 62 of the cylinder block 31 by spaced-apart bearings 63 and 64 mounted in end walls of this chamber 61 formed integrally by the cylinder block 31.

The chain 56 then extends upwardly so as to drive a sprocket like the sprocket 57 and which is fixed to either the intake camshaft 47 of the cylinder bank 36 or exhaust camshaft 53 of this bank. The timing chain 56 then passes back to the crankshaft sprocket 55. Of course, tensioner mechanisms may be employed for maintaining the chain 56 under tension. This type of drive is known, and for that reason a further description of it is not believed to be necessary.

Since one camshaft of each cylinder head assembly 35 and 36 is driven directly by the crankshaft, it is possible to drive the remaining camshaft from the crankshaft-driven camshaft. Thus, each of the camshafts 47 and 53 associated with each cylinder bank is provided with a further sprocket 66 (FIG. 5). This sprocket 66 is spaced inwardly from the end of the respective camshaft and cooperates with a further timing chain (not shown) for transferring the drive between the cam shafts of the respective cylinder bank.

Exhaust manifolds 67 and 68 (FIG. 2) are affixed to the exhaust sides of the cylinder head assemblies 35 and 36. These exhaust manifolds collect the exhaust gases from the respective combustion chambers 37. The exhaust manifolds 67 and 68 cooperate with an appropriate exhaust system (not shown) for discharging the exhaust gases from the engine to the atmosphere.

The induction system 48 by which the fuel-air charge is delivered to the combustion chambers 37 will now be described first by reference to FIGS. 1–4. This induction system 48 is comprised of a throttle body, indicated generally by the reference numeral 69 and shown in FIGS. 3 and 4. This throttle body 69 is disposed at one end of the cylinder bank 35 and receives atmospheric air from an air inlet device which is not shown. The throttle body 69 includes one or two manually operated throttle valves that control the total air flow to the engine. As is typical, a bypass system may be provided in the throttle body 69 for bypassing these throttle valves and controlling the engine idle air flow.

Figure 6:
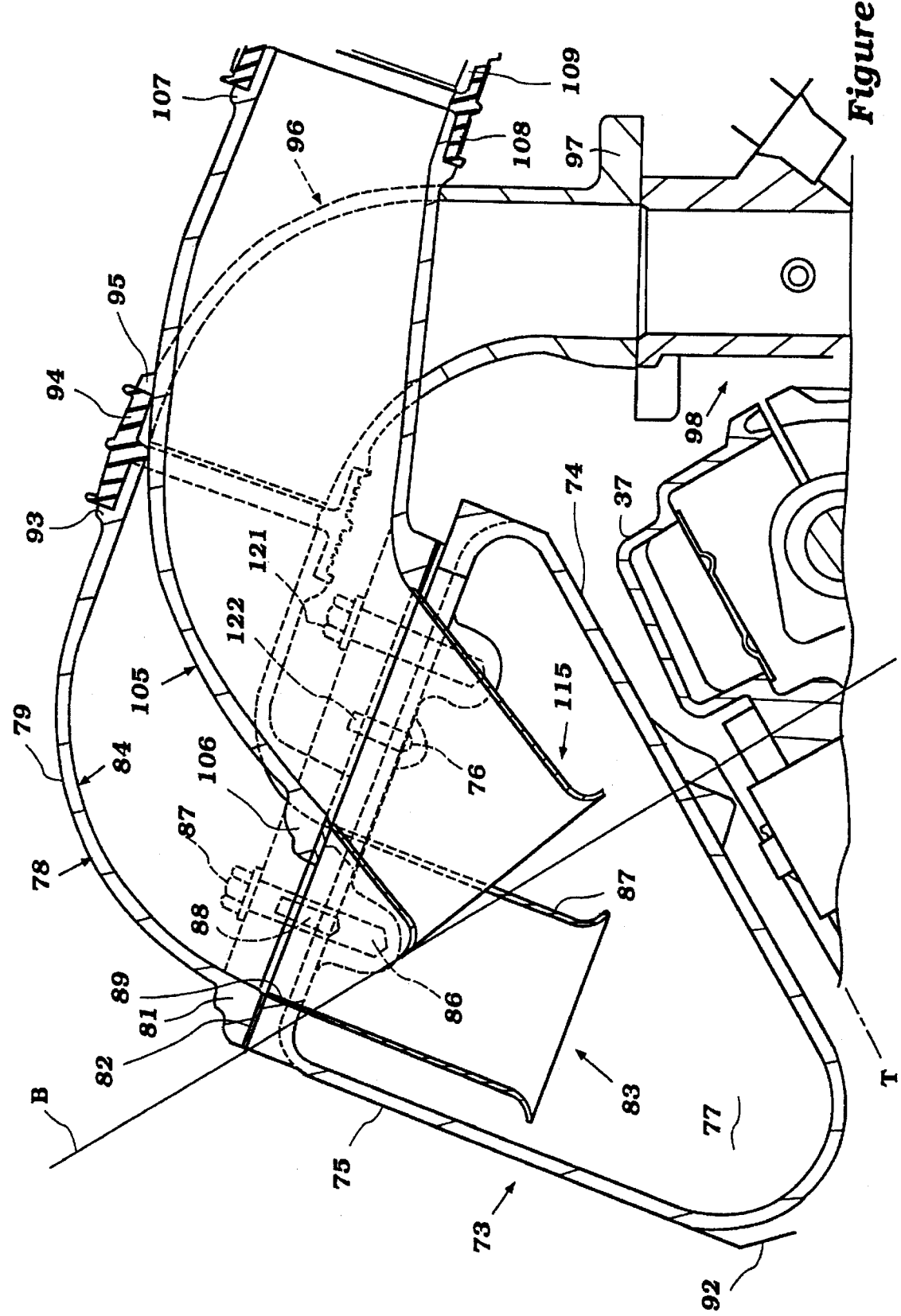
FIG. 6 is an enlarged cross-sectional view of the same area of the induction system shown in FIG. 2, showing the construction of the plenum chamber and its relationship to the manifold runners which serve the individual cylinder banks.

The throttle body 69 is connected by means of a flexible conduit 71 to an inlet duct 72 of a plenum chamber device, indicated generally by the reference numeral 73. This plenum chamber device 73 has a configuration, as best shown in FIGS. 2 and 6, and will be described by primary reference to those figures. It should be noted that the cylinder bank 32, and specifically the cam cover upper surface 37, is disposed so as to lie along a plane T which extends perpendicularly to a plane B that contains the axis of the cylinder bores of the cylinder bank 32. As installed in the vehicle, the plane T is at an acute angle to a horizontal plane.

The plenum chamber 73 has a generally triangular configuration that is comprised of a lower base part 74 and a pair of equal length leg parts 75 and 76 which form generally an isosceles triangle. The base portion 74 extends generally parallel to the plane T and is spaced slightly above it. Because of this shape, the plenum chamber 73 may have a very large volume and still clear the hood under surface 28 and permit the manifold runner connections that will be described. Thus, the plenum chamber 75 defines a longitudinally extending volume 77 which is substantially coextensive with the cylinder head assembly 35 terminating at the inlet end 72. It should be noted that the plenum chamber volume 77 is such that this provides the total volume, along with the inlet section 72, for the plenum system for the engine.

A first manifold assembly, indicated generally by the reference numeral 78, supplies an intake air charge from the plenum chamber volume 77 to the cylinder head intake passages 46 of the adjacent cylinder head assembly 35. This manifold section 38 includes arcuately curved portions 79 that have a flange 81 formed at one end thereof that is engaged with a sealing gasket 82 for providing a connection to the surface 76 of the plenum chamber device 73.

Figure 7:
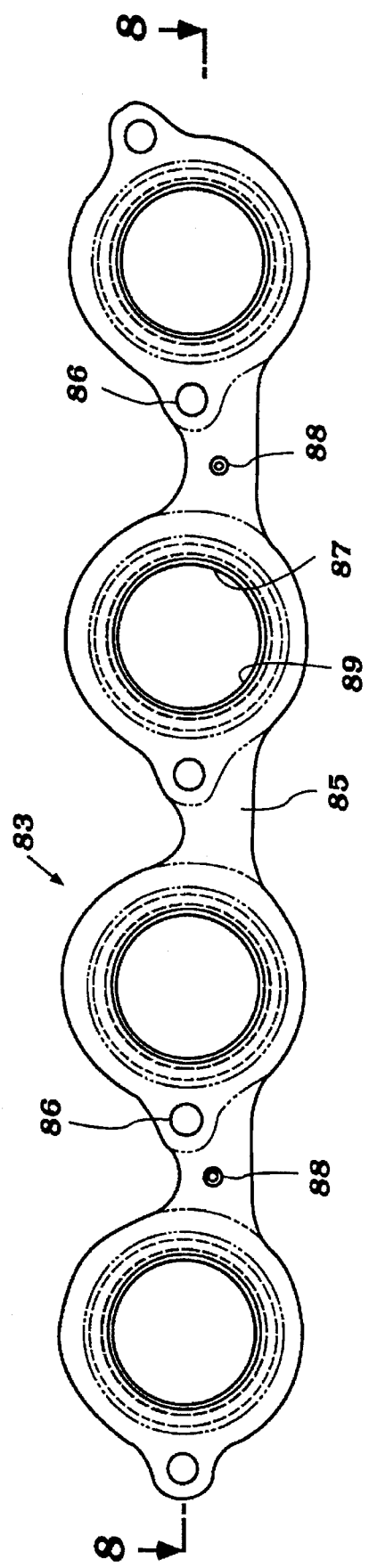
FIG. 7 is a plan view showing one of the manifold runner trumpet sections.
Figure 8:
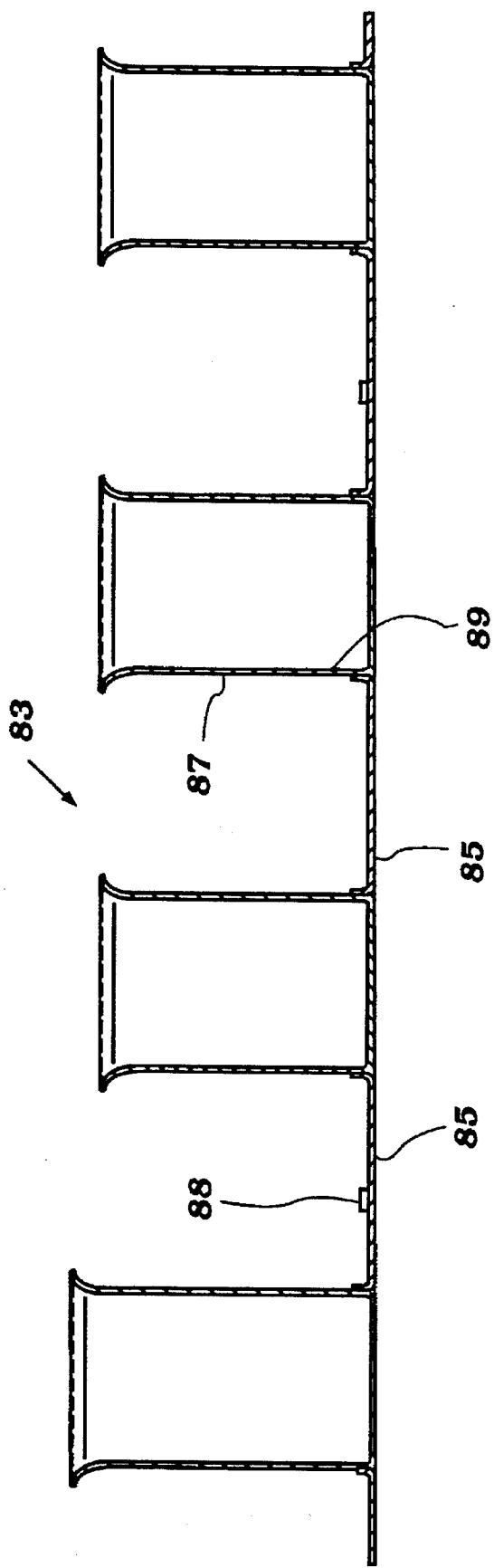
FIG. 8 is a cross-sectional view taken along the line 8—8 of FIG. 7 for this manifold trumpet section.
Figure 9:
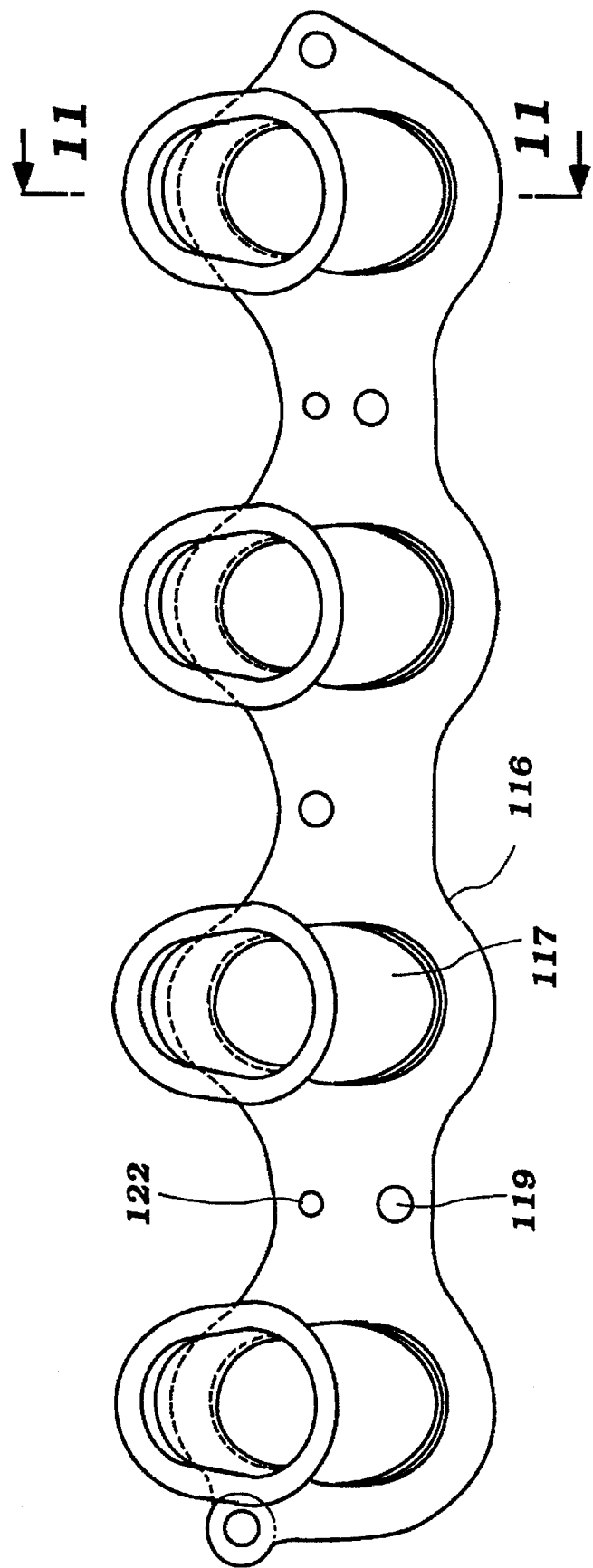
FIG. 9 is a top plan view looking in the same direction as FIG. 7 and showing the other manifold trumpet section.
Figure 10:
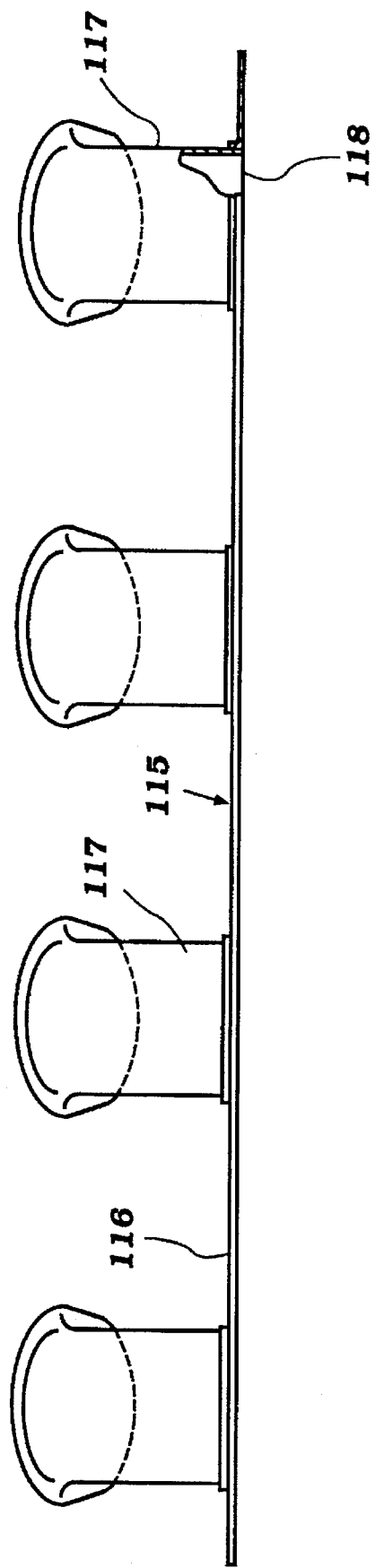
FIG. 10 is a side elevational view of the manifold trumpet section shown in FIG. 9.

A trumpet assembly, indicated generally by the reference numeral 83 and shown in most detail in FIGS. 7 and 8, is fixed within the plenum chamber volume 77 at the ends of passages 84 of the manifold runners 78. The trumpet assembly 83 includes a flange portion 85 having openings 86 that receive threaded fasteners 87 for affixing this trumpet assembly in place. Individual trumpets 87 are affixed to the flange portion 85 and extend into the plenum volume 77 for providing the desired length between the plenum volume 77 and the intake passages 46 served thereby. Locating pins 88 are employed to accurately position the trumpet assembly 83.

The trumpets 87 have internal diameters 89 that are complementary in cross-sectional area to the flow passages 84 of the runners 79. It should be noted that the trumpet body 83 is mounted basically at one side of the leg 76 adjacent the point where the leg 76 joins the leg 75. This is done so as to place the trumpet body 83 further away from the cylinder head intake passages 46 which it serves, so as to maintain equal-length runners, as will be noted, between the plenum chamber volume 77 and the intake passages 46 of the cylinder heads 35 and 36, respectively.

Since the plenum chamber device 73 is placed over the cylinder head 35, it is necessary to elongate the runners which connect it to the intake passages of this cylinder head 35 so as to maintain the same length as runners that serve the intake passages 46 of the cylinder head 36.

It should be noted that the plenum chamber device 73 is mounted on the outer end of the cylinder head assembly 35 by one or more brackets 91 which are bolted to bosses 92 of the plenum device 79 and to mounting pads formed on the cylinder head 35.

The ends of the runners 78 are formed with portions 93 that receive flexible couplings 94 for connecting them to flange portions 95 of further runner sections 96. The runner sections 96 curve downwardly and terminate in flanges 97 that are mounted to a control valve body 98. The control valve body 98 is interposed at the outer terminus of the valley between the cylinder banks.

Figure 4:
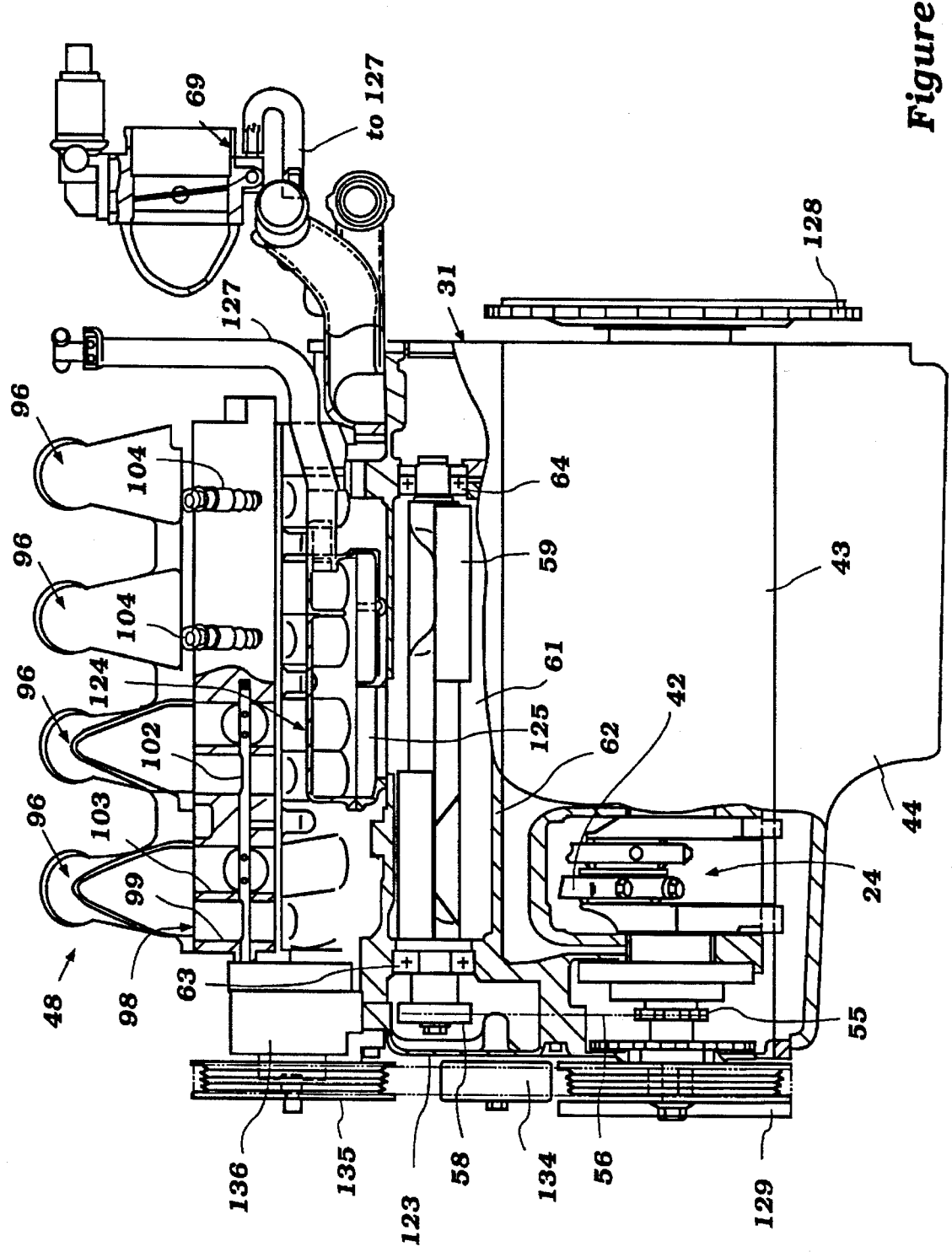
FIG. 4 is a view looking generally in the direction of the arrow 4—4 of FIG. 3 and with a portion of this view being shown in section.
Figure 5:
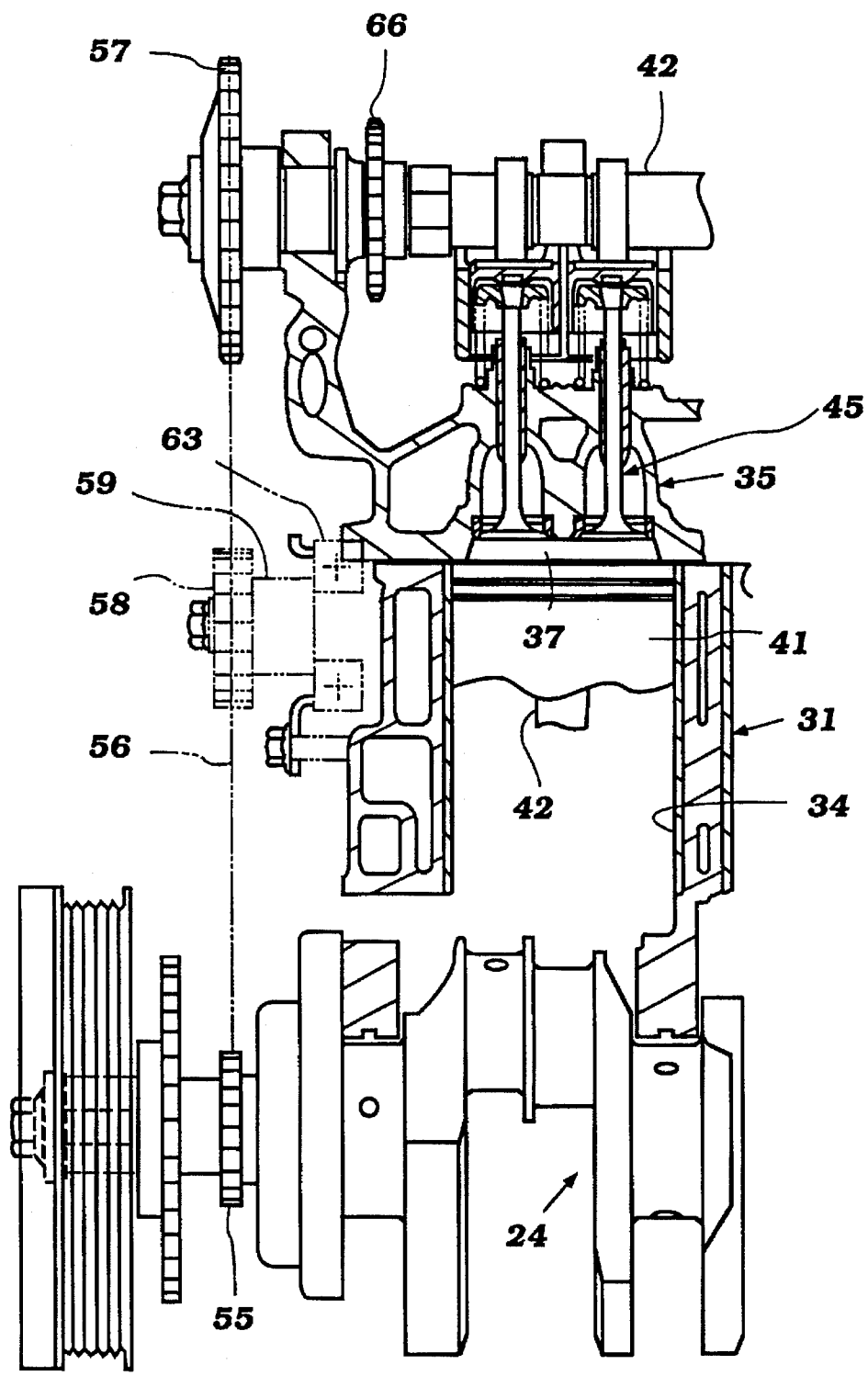
FIG. 5 is an enlarged cross-sectional view, taken generally along the line 5—5 of FIG. 4, and shows the driving arrangement for one of the camshafts.

This control body 98 has, as may be best seen in FIG. 4, a pair of induction passages 99 and 101 which extend to adjacent intake passages 46 for each combustion chamber 37. A control valve shaft 102 is rotatably journaled in the control valve body 98 and is operated by a suitable servo motor (not shown). The control valve shaft mounts butterfly-type control valves 103 in only the passages 101. Hence, when the control valves 103 are closed, one of the intake passages for each combustion chamber recess 37 will be substantially closed. Thus, a higher flow velocity will exist into the combustion chambers under this condition so as to improve turbulence and low-speed running.

As the speed and load on the engine increases, the control valves 103 are opened by the controlling servo motor, and the breathing capacity of the engine is improved and high outputs can be achieved. Thus, the device acts like a split induction system in that at low speeds and low loads, there is a small flow area and high flow velocities. At high speeds and loads, however, the engine is free breathing, and hence can achieve maximum power outputs.

Fuel injectors 104 are mounted in the control valve body 98 and spray into the unthrottled intake passages 99 for delivering a fuel charge to the combustion chambers of the respective cylinder head 35. These fuel injectors 104 are supplied by a suitable fuel supply system including a pump, to be described later, and are controlled in an appropriate manner.

The combustion chambers 37 of the right-hand cylinder head 36 are served from the plenum chamber 73 by a system similar to that which serves the cylinder head 35. However, the configuration of this system is different, so as to maintain substantially uniform length between the runners that serve the cylinder head 36 and those that serve the cylinder head 35. Therefore, there is provided a first series of manifold runners 105 that extend from flanges 106 affixed to the plenum chamber outer wall 76 and which curve gradually to sections that terminate in flanged ends 107. These flanged ends 107 are connected by flexible couplings 108 to further flanges 109 of runner sections 111 that extend down and terminate at flanges 112 that are affixed to the side of the control valve body 98 opposite from the sections 96.

Like the other side of the control valve body 98, each intake passage is served by two flow passages, one of which has a control valve 103, as previously described, for the aforedescribed purposes. As with the side of the control valve body 98 that serves the cylinder head 35, the side that serves the cylinder head 36 also has fuel injectors 104 mounted in it, which spray into the unthrottled intake passages 99.

As with the opposed cylinder bank, a series of trumpet bodies formed by a trumpet body assembly 115 are mounted on the inlet side of the plenum device 73 and which communicates with the manifold runners 105. This trumpet body 115 is formed from a mounting flange 116 having a plurality of trumpets 117 extending therefrom and which have flow openings 118. Again, the flange 116 is formed with openings 119 that receive threaded fasteners 121 for affixing the trumpet body 115 to the interior of the plenum chamber 73 along its wall 76. Again, the flange 116 has locating pins 122 that assist in the accurate locating of the trumpet body assembly 115.

Figure 12:
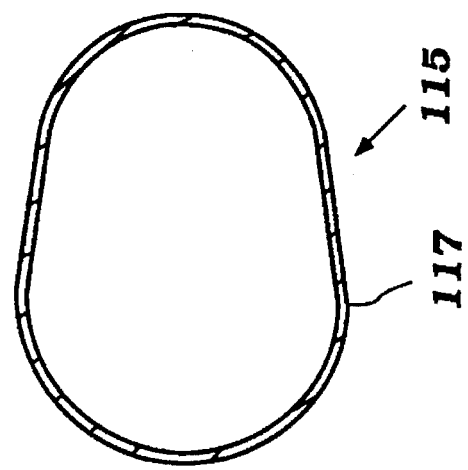
FIG. 12 is a cross-sectional view taken along the line 12—12 of FIG. 11.
Figure 11:
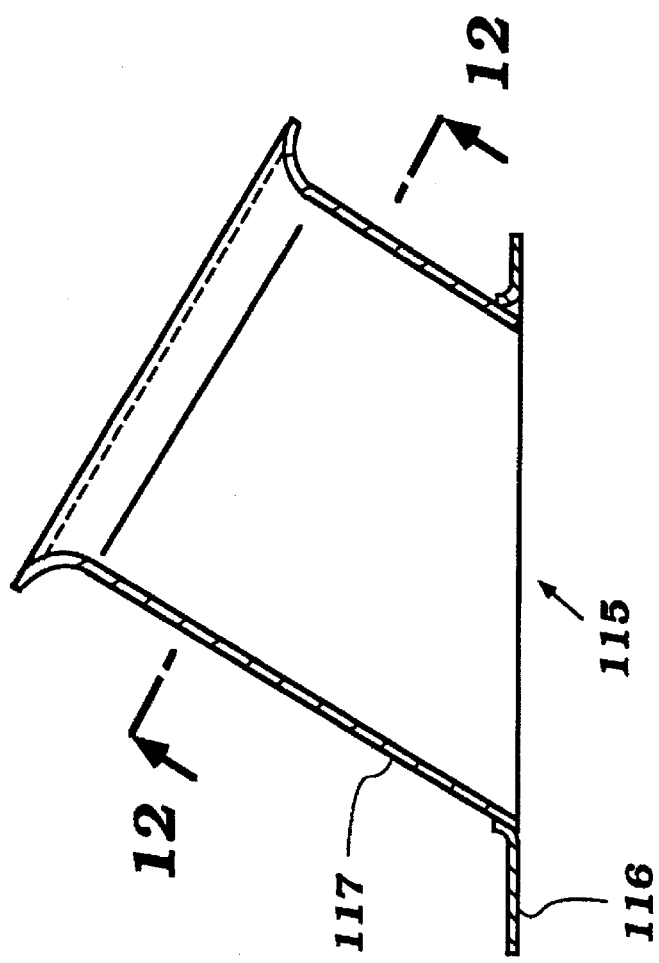
FIG. 11 is an enlarged cross-sectional view taken along the line 11—11 of FIG. 9.

As may be seen in FIGS. 11 and 12, each of the trumpet bodies 117 has a generally oval-shaped flow passage so as to provide a compact assembly and nevertheless to afford a maximum flow area for its size. It will be seen that the trumpet bodies 115 extend to a much lesser extent into the plenum volume 77 than the trumpet bodies 87. This coupled with their greater cross-sectional flow area provides balancing in the flow restrictions between the two paths to the respective cylinder head combustion chambers 37. Thus, the resulting construction will ensure that the breathing efficiency of each cylinder bank is the same.

The engine 23 has obviously a lubricating system that includes the crankcase member 44 which contains the lubricant for the engine. The specific lubricating system does not form an important part of the invention, but the crankcase ventilating system will be described by particular reference to FIG. 4. It should be seen that the timing chain 56 is closed in the area of the idler pulley 58 and balance drive by a cover plate 123. This chamber, as well as the crankcase chamber, are ventilated to the balance shaft chamber 61. From there the ventilating gases may flow through a vapor separator 124 that is mounted in the valley of the engine below the manifolding system just described.

This chamber has an opening 125 in its lower surface that communicates with the balancer shaft chamber 61 so that the ventilating gases may flow upwardly and oil separated therefrom. The separated oil will deposit on a lower wall 126 of the separator 124 and drain back through the opening 125 to the crankcase.

The vapor separator 124 communicates with a conduit 127 which is connected at its discharge end to a position in the induction system; for example, to the throttle body 69. Thus, the ventilating gases will not be discharged directly to the atmosphere, but will pass through the engine combustion chambers again so that any hydrocarbons therein will be burned and not discharged to the atmosphere.

As seen in FIG. 4, a flywheel 128 is mounted to one end of the crankshaft 24. This flywheel 128 can be coupled to a suitable transmission for providing drive to the vehicle wheels in any known manner.

The opposite end of the crankshaft 24 has connected to it a combined damper and pulley assembly 129. This damper and pulley assembly 129 drives a serpentine drive belt 131, which drives a number of engine accessories. These may include an air conditioning compressor 132 having a drive pulley 133 and which is mounted adjacent the forward end of the engine, as mounted in the engine compartment. This serpentine belt 131 then carries on and passes over an idler tensioner pulley 134 and then drives a pulley 135 for a high-pressure fuel pump 136 that supplies fuel under pressure to the fuel injection system through a conduit 137.

The belt 131 continues on over an additional idler tensioner pulley 138 and then drives the drive pulley 139 of an alternator 141. From the alternator pulley 141, the belt 131 returns over a further pair of idler pulleys 142 and 143 to again engage the crankshaft pulley 129.

Thus, from the foregoing description it should be readily apparent that the described arrangement provides a very compact and yet high-efficiency induction system for an engine that will achieve good power outputs, uniform running of all cylinders, and still be capable of maintaining low hood lines for the associated vehicle. Of course, the foregoing description is that of a preferred embodiment of the invention. It will be readily apparent to those skilled in the art how the invention may be utilized in a number of different configurations than the preferred embodiment without departing from the spirit and scope of the invention, as defined by the appended claims.

What is claimed is:

1. An internal combustion engine having a cylinder block with a plurality of cylinder bores, a cylinder head assembly affixed to one end of said cylinder block enclosing said cylinder bores to form a plurality of combustion chambers, said engine and said cylinder head assembly being configured so that an upper surface of said cylinder head assembly is inclined at an acute angle to a horizontal plane, a plurality of intake passages formed in said cylinder head for supplying a charge to said combustion chambers, a plenum chamber supported above said cylinder head assembly upper surface and having a generally triangular configuration with the base of said triangle extending generally parallel to said cylinder head upper surface, and a plurality of runner sections extending from said plenum chamber to said cylinder head intake passages.

2. An internal combustion engine as defined in claim 1, wherein all of the intake passages of the cylinder head are served from the same plenum chamber.

3. An internal combustion engine as defined in claim 2, wherein the intake passages are all served by runner sections that communicate with the plenum chamber through the same triangular side thereof.

4. An internal combustion engine as defined in claim 3, wherein the plenum chamber is mounted on the cylinder head assembly by bracket means affixed to one side of said cylinder head assembly and to the corresponding side of said plenum chamber.

5. An internal combustion engine as defined in claim 2, wherein the engine is provided with a second cylinder bank having a plurality of cylinder bores and disposed at an angle to the first-mentioned cylinder bank and closed by a second cylinder head assembly.

6. An internal combustion engine as defined in claim 5, wherein a first set of runners serves the intake passages of the first cylinder head assembly from the plenum chamber and a second series of runners serves the intake passages of the second cylinder head assembly from the plenum chamber.

7. An internal combustion engine as defined in claim 6, wherein the runners for the respective cylinder banks terminate in individual flange portions that are disposed in side-by-side relationship on the plenum chamber.

8. An internal combustion engine as defined in claim 7, wherein substantially all of the runners have substantially the same length.

9. An internal combustion engine as defined in claim 8, wherein the runners include first sections fixed to the plenum chamber and second sections fixed to the respective cylinder head assembly, with a flexible coupling therebetween.

10. An internal combustion engine as defined in claim 1, wherein the runners are served by intake trumpets that extend into the plenum chamber.

11. An internal combustion engine as defined in claim 10, wherein all of the intake passages of the cylinder head are served from the same plenum chamber.

12. An internal combustion engine as defined in claim 11, wherein the intake passages are all served by runner sections that communicate with the plenum chamber through the same triangular side thereof.

13. An internal combustion engine as defined in claim 12, wherein the plenum chamber is mounted on the cylinder head assembly by bracket means affixed to one side of said cylinder head assembly and to the corresponding side of said plenum chamber.

14. An internal combustion engine as defined in claim 11, wherein the engine is provided with a second cylinder bank having a plurality of cylinder bores and disposed at an angle to the first-mentioned cylinder bank and closed by a second cylinder head assembly.

15. An internal combustion engine as defined in claim 5, wherein a first set of runners serves the intake passages of the first cylinder head assembly from the plenum chamber and a second series of runners serves the intake passages of the second cylinder head assembly from the plenum chamber.

16. An internal combustion engine as defined in claim 15, wherein the runners for each cylinder head assembly are served by respective series of intake trumpets that extend into the plenum chamber.

17. An internal combustion engine as defined in claim 16, wherein the respective series of intake trumpets are disposed in side by side relation in the plenum chamber.

18. An internal combustion engine as defined in claim 17, wherein the runners for the respective cylinder banks terminate in individual flange portions that are also disposed in side-by-side relationship on the plenum chamber.

19. An internal combustion engine as defined in claim 18, wherein substantially all of the runners have substantially the same length.

20. An internal combustion engine as defined in claim 19, wherein the runners include first sections fixed to the plenum chamber and second sections fixed to the respective cylinder head assembly, with a flexible coupling therebetween.

* * * * *